July 19, 1927.

1,636,542

J. P. WILLIS

PISTON HAVING AN ADJUSTABLE HEAD FOR FACILITATING THE
REMOVAL OF THE PISTON RINGS

Filed Oct. 2, 1926

Inventor
John P. Willis
By Lester L. Sargent
Attorney

Patented July 19, 1927.

1,636,542

UNITED STATES PATENT OFFICE.

JOHN P. WILLIS, OF JENKINS, KENTUCKY.

PISTON HAVING AN ADJUSTABLE HEAD FOR FACILITATING THE REMOVAL OF THE PISTON RINGS.

Application filed October 2, 1926. Serial No. 139,167.

The object of my invention is to provide a novel type of piston which will permit of the insertion of piston rings without their having to be expanded out of shape to get them in place; and which will permit of the insertion of the piston rings without removing the piston from the cylinder.

I attain these and other objects of my invention by the mechanism illustrated in the accompanying drawings, in which—

Like numerals indicate like parts in each of the several views.

Figure 1:
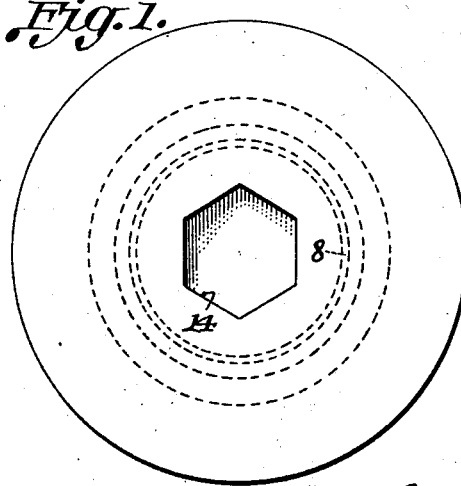
Figure 1 is a top plan of the invention.
Figure 3:
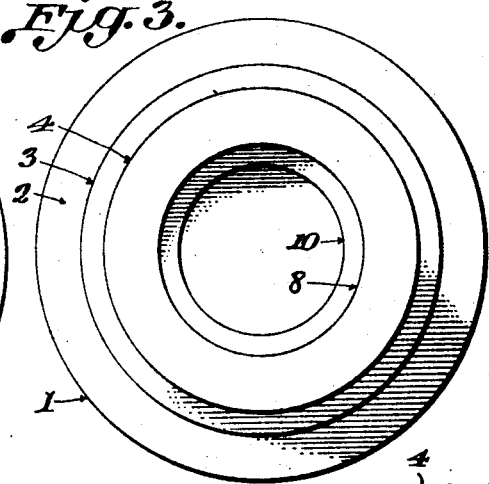
Fig. 3 is a top plan view with the head 9 removed.
Figure 2:
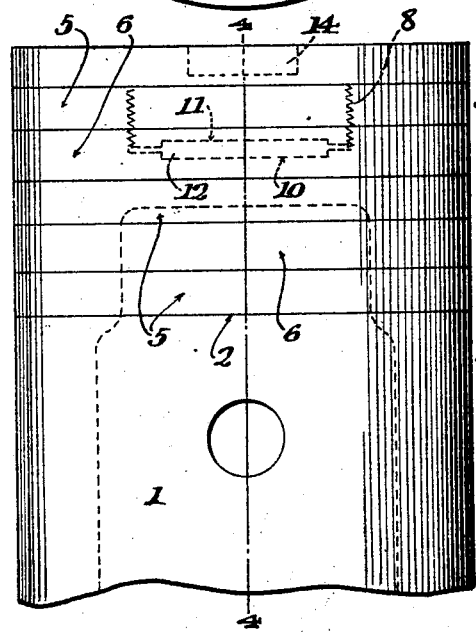
Fig. 2 is a side elevation of my invention.
Figure 4:
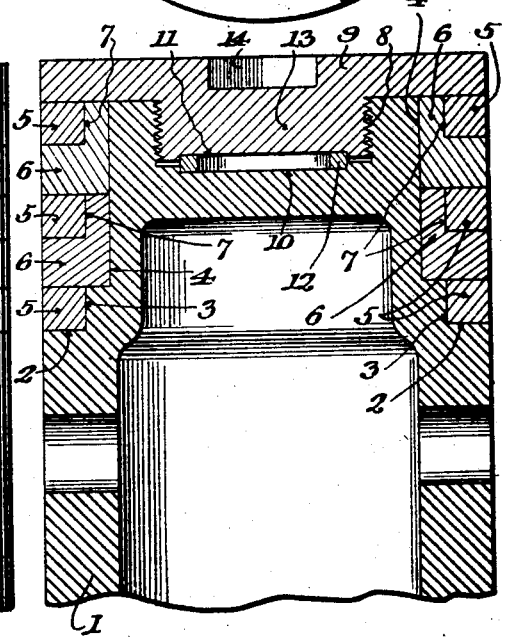
Fig. 4 is a vertical section on line 4—4 of Fig. 2.

Referring to the accompanying drawings, I provide a piston 1 having a removable head 9 which is screw threaded at 8 to the end of the piston and which seats on the lock-washer 12 in chamber 10. I provide piston rings 5 spaced apart by the spacing rings 6, which latter members are approximately L-shaped in cross section, having their inner surfaces flush with the wall 4 of the piston. The piston is provided with a suitably recessed portion formed by the horizontal shoulder 2 and the vertical shoulder 3, as shown in Fig. 4, to receive the bottom of the piston rings 5, the upper piston rings seating against the vertical portion 7 of the respective spacing rings 6, as shown in Fig. 4. Removable head 9 is provided with a cylindrical projecting portion provided with a screw threading 8 and having the recessed end portion 11 in which washer 12 seats, as well as in the chamber 10.

The piston can be used the same as any other where the pressure is on one end.

In order to assemble the parts of the invention, the lowermost piston ring is first inserted and then the spacing ring 6 is inserted; then the next piston ring and another spacing ring 6, then the uppermost piston ring 5 and finally the removable head 9 is screwed in place by means of a suitable wrench which is inserted in the wrench opening 14 in the end of the piston head. No other tool than the wrench is required in assembling the parts of the invention.

Owing to the fact that the rings are not sprung out of shape in placing them in position, it will be found that they fit the cylinder accurately from the start. The wear of the rings can be taken up simply by taking a little metal off the spacing rings. My invention permits of the cleaning of the carbon from the piston head by simply taking the head out, which is simply accomplished. The invention also makes it easy to examine the piston rings when desired.

It is within the contemplation of my invention to fasten on larger piston heads with bolts, if desired.

What I claim is:

In a device of the class described, the combination of an annularly recessed piston head, spacing rings removably seated on the recessed portion of said piston, rings alternately arranged with the spacing rings, and a removable head having a screw-threaded cylindrical projection engaging a correspondingly recessed portion of the piston head, said projection and the aforesaid piston head being correspondingly recessed to receive a lock washer.

JOHN P. WILLIS.